D. E. FREY.
FRICTION CLUTCH.
APPLICATION FILED SEPT. 20, 1910.

994,737.

Patented June 13, 1911.

Witnesses
Frederick L. Fox,
John A. Donegan.

Inventor
Daniel E. Frey.
By Victor J. Evans
Attorney

UNITED STATES PATENT OFFICE.

DANIEL E. FREY, OF SCOTIA, CALIFORNIA.

FRICTION-CLUTCH.

994,737. Specification of Letters Patent. Patented June 13, 1911.

Application filed September 20, 1910. Serial No. 582,887.

*To all whom it may concern:*

Be it known that I, DANIEL E. FREY, a citizen of the United States, residing at Scotia, in the county of Humboldt and State of California, have invented new and useful Improvements in Friction-Clutches, of which the following is a specification.

This invention relates to improvements in friction clutches, and has for its object the provision of a clutch including outer and inner wheels, the hubs of which are so constructed that when positioned on a shaft they will coöperate to prevent movement of the loose wheel longitudinally of the shaft.

Another object is the provision of a friction clutch constructed to occupy a minimum of space on a shaft.

A further object is the provision of an improved mounting for the friction shoe, the said mounting being so constructed that the friction shoe may be operated with a minimum of effort and positively held when in and out of engagement with the friction band.

With these and other objects in view, which will more fully hereinafter appear, the present invention consists in certain novel details of construction and arrangement of parts, hereinafter fully described, illustrated in the accompanying drawings, and more particularly pointed out in the appended claims; it being understood that various changes in the form, proportion, size, and minor details of the device may be made, within the scope of the appended claims, without departing from the spirit or sacrificing any of the advantages of the invention.

Figure 1:
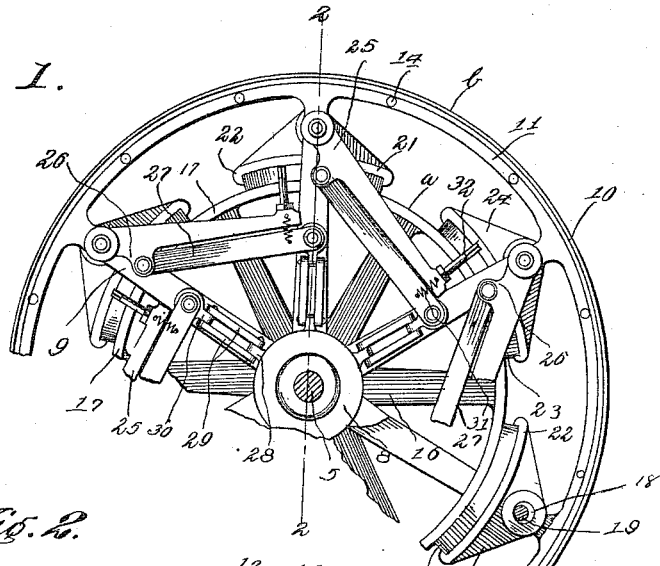
Figure 2:
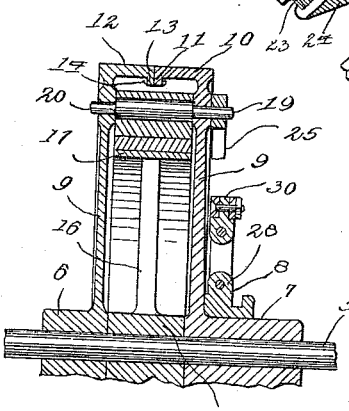
Figure 3:
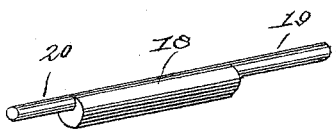
Figure 4:
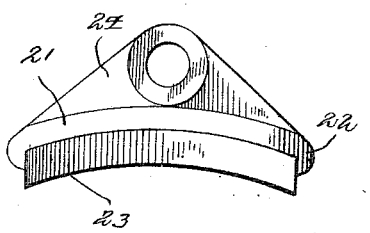

In the accompanying drawings, forming part of the specification;—Figure 1 is a side elevation of the device. Fig. 2 is a sectional end view on the line 2—2 of Fig. 1. Fig. 3 is a detail perspective of one of the shoe hangers. Fig. 4 is a detail side elevation of one of the shoe webs.

Similar numerals of reference are employed to designate corresponding parts throughout.

The shaft upon which the clutch is mounted is designated by the numeral 5. What will subsequently be termed the inner wheel is designated by *a* and the outer or larger wheel by *b*. The outer wheel *b* comprises a hub made up of two sections designated by the numerals 6 and 7. The hub sections 6 and 7 are of different lengths, the longer section 7 having slidingly fitted on the outer end portion thereof a grooved collar 8. The hub sections 6 and 7 are arranged in spaced relation and extending radially from the inner end portions of said hub sections are a plurality of spokes 9. The spokes 9 of the hub sections 7 are connected at their outer ends by a rim 10, the outer side of said rim being substantially in a plane with the outer sides of the spokes while the inner side extends considerably beyond the inner sides of the spokes and terminates in an inwardly extending circular flange 11. The spokes of the hub section 6 correspond in number and length to the spokes of the hub section 7, and at their outer ends are connected by a band 12, similar to the band 11 and the flange 13 of which bears on the flange 11. These flanges have alining openings for the reception of clamping elements 14 as shown in Fig. 2. With this construction it will be manifest when the sections of the outer wheel are assembled that a considerable space will exist between the inner ends of the hub sections 6 and 7.

The inner wheel *a* comprises a hub section 15, of a size to nicely fit between the inner ends of the hub sections 6 and 7. Extending radially from the medial portion of the hub 15 of the inner wheel are a plurality of spokes 16 considerably less in length than the spokes 9 of the outer wheel, the outer ends of the spokes 16 being connected by a friction band 17, the outer periphery of which is spaced for a considerable distance from the inner periphery of the outer wheel *b*. With this construction it will be manifest that the wheels of the clutch will occupy a minimum of space on the shaft 5 and at the same time the hub 15 of the inner wheel will, by virtue of its disposition positively prevent movement of the outer wheel longitudinally of the shaft 5, it being understood that the hub 15 is keyed to the shaft 5.

The spokes 9 of the outer wheel, adjacent to their outer ends are provided with alining openings for the reception of the opposite ends of the hanger shafts for the shoes. Since the hanger shafts are all identical in structure a description of one will be sufficient. By reference now to Fig. 3 it will be seen that each of the hanger shafts includes a cylindrical body portion 18, corresponding in length, approximately to the distance between the opposed inner sides of the spokes 9 of the outer wheel. The opposite ends of the cylindrical body portion 18 are provided with alining trunnions 19 and 20, arranged eccentric of the body portion 18 and which are loosely fitted in the alining openings at the outer end portions of the spokes 9. The trunnions 19 and 20 are unequal in length the longer of said trunnions 19, extending beyond one side of the outer wheel.

The friction shoes are all identical in structure, therefore a description of one will be sufficient:—Each friction shoe includes a curved body 21 of suitable length, corresponding in width approximately to the width of the rims 10 of the inner wheel and the opposite end portions of which are bent at right angles as shown at 22 and extend beyond the concaved face of the body 21. Arranged on the concaved face of the body portion 21 is a block of wood or other analogous material designated by the numeral 23, the said block corresponding in width to the width of the body portion 21 and conforming to the configuration of the latter, the opposite ends of said block binding on the bent end portions 22 of the body 21. The block 23 is of such thickness that its concaved surface will extend considerably beyond the outer ends of the bent portion 22 so as to bear when moved in one direction, on the band 17 of the inner wheel. Formed on the convexed surface of the body 21 is a triangular-shaped rib 24, the central portion of said rib having an opening for the loose reception of the cylindrical body portion 18 of the shoe hanger. With this construction it will be manifest when the shoe hanger is partially turned, in one direction the shoe will move into engagement with the band of the inner wheel *a*, and when turned in the opposite direction will move away from the band of the inner wheel *a*.

In order that the shoes may be operated simultaneously to move into and out of engagement with the inner wheel *a* the following construction is employed:—By reference now to the drawings it will be seen that the extending end portions of the trunnions 19 have fixedly secured thereto one end of cranks 25, said cranks extending transverse the space between the hubs 9 of the outer wheel. The cranks are provided adjacent their points of connection with the trunnions 19 and on their inner sides with laterally extending lugs 26, and pivoted to these lugs 26 are one end of arms 27, the said arms 27 extending parallel with the cranks 25 with their opposite ends extending a trifle beyond the free ends of the cranks 25. By reference now to the drawings it will be seen that the sliding collar 8 is provided with a plurality of pairs of radially extending perforated lugs 28, between which are pivoted one end of a plurality of links 29. Pivoted to the ends of the arms opposite to the ends connected with the cranks 25 are one end of extensions 30, said extensions 30 having their opposite ends pivoted to the ends of the links 29 opposite to the ends of the latter in engagement with the collar 8. With this construction it will be manifest, when the parts are in position shown in full lines in Fig. 2 and the shoes in engagement with the friction band 17 that outward movement of the collar 8 will rock the links 29, thus drawing one end of the levers 27 inwardly and moving the opposite ends outwardly. This outward movement of the opposite ends of the levers 27 will turn the cranks 25 and by virtue of the connection between the latter and the trunnions 19, the said trunnions will be turned, whereby the shoe will be moved from engagement with the friction band 17. It will be apparent when the collar is moved in the opposite direction that the parts will move in directions opposite to those just described, whereupon the shoes will move into engagement with the friction band 17.

The cranks 25 and arms 27 are connected adjacent to one end by means of helical retractile springs 31, these springs operating to yieldingly hold the cranks and arms parallel with each other.

A means is provided to compensate for wear of any of the blocks, the said means including set screws 32 which are screwed into transverse openings adjacent to the free ends of the cranks 25, the inner ends of said screws engaging with the outer sides of the arms 27 when the screws are turned in one direction. By the provision of this construction it will be seen when one block wears in advance of the other the wear may be compensated for by turning one of the screws 32 which will move the crank 25 and arm 27 relatively to each other, thus decreasing the distance through which the shoe will pass when moving into engagement with the friction band 17.

From the foregoing, it is evident that I have provided a device which is comparatively simple in structure and inexpensive to manufacture, embodying few parts and these so arranged that the danger of derangement will be reduced to a minimum.

I claim:—

1. In a friction clutch, an inner wheel, an outer wheel having its rim spaced from the rim of the inner wheel, a cam shaft supported by the outer wheel and arranged in the space between said rims, a shoe loosely fitted on the cam shaft, a lever secured to one end of the cam shaft, an arm pivoted to the lever, a yielding connection between the arm and lever, and means for moving the arm, for the purpose described.

2. In a friction clutch, an inner wheel, an outer wheel having its rim spaced from the rim of the inner wheel, a shoe, and means connecting said shoe to the outer wheel serving to move the shoe into and out of engagement with the rim of the wheel, a crank for turning the shoe actuating means, an arm pivoted at one end to the crank, a yielding connection between the arm and crank, adjusting means associated with the crank and serving to move the latter relatively to the arm to vary the distance through which the shoe passes when moving into and out of engagement with the said inner band, and means for moving the arm to turn the crank, and means for actuating the arm, for the purpose described.

In testimony whereof I affix my signature in presence of two witnesses.

DANIEL E. FREY.

Witnesses:
J. W. EVANS,
W. S. COOPER.

Copies of this patent may be obtained for five cents each, by addressing the "Commissioner of Patents, Washington, D. C."